United States Patent [19]

Hanson et al.

[11] Patent Number: 4,555,944

[45] Date of Patent: Dec. 3, 1985

[54] METHOD AND APPARATUS FOR PRODUCING A CONTROLLED PRELOAD ON A TRANSDUCER ASSEMBLY

[75] Inventors: Richard A. Hanson, Woodinville; Steven A. Foote, Redmond, both of Wash.

[73] Assignee: Sundstrand Data Control, Inc., Redmond, Wash.

[21] Appl. No.: 605,885

[22] Filed: May 1, 1984

[51] Int. Cl.⁴ .................. B23P 15/13; G01P 11/02
[52] U.S. Cl. .................. 73/517 B; 29/25.41; 29/446; 29/447; 29/450; 29/602 R; 73/431
[58] Field of Search .......... 73/517 B, 517 R, 517 AV, 73/75 G, 431; 29/25.41, 446, 447, 450, 602

[56] References Cited

U.S. PATENT DOCUMENTS

| | | |
|---|---|---|
| 3,152,485 | 10/1964 | Lones et al. |
| 3,339,419 | 9/1967 | Wilcox. |
| 3,673,873 | 7/1972 | Estes et al. |
| 3,702,073 | 11/1972 | Jacobs. |
| 3,792,526 | 2/1974 | Bremseth .................. 29/602 R |
| 4,169,309 | 10/1979 | Meginnis .................. 29/447 |

*Primary Examiner*—S. Clement Swisher
*Attorney, Agent, or Firm*—Christensen, O'Connor, Johnson & Kindness

[57] ABSTRACT

A transducer assembly includes first and second stators which are axially aligned with, and bear upon opposite sides of a proof mass. The stators and proof mass are clamped together by means of a sleeve having a side portion with spaced apart upper and lower flanges extending therefrom. The flanges bear against receiving surfaces on the stators with the sleeve under elastic deformation such that a compression force tending to reduce the spacing between the flanges is transmitted to the stators and proof mass as a controlled compressive axial preload.

32 Claims, 12 Drawing Figures

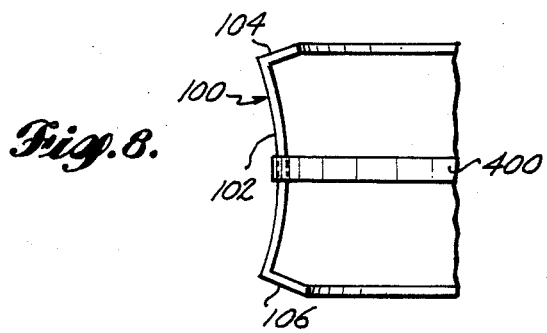

METHOD AND APPARATUS FOR PRODUCING A CONTROLLED PRELOAD ON A TRANSDUCER ASSEMBLY

BACKGROUND OF THE INVENTION

The present invention pertains to the transducer art and, more particularly, to a method of, and means for producing a controled preload on a transducer assembly.

Transducer assemblies commonly comprise one or more mating sections which, in final assembly, are clamped together by suitable means. In many transducer configurations, this clamping force can lead to offsets in the transducer sensing elements. A particular example of such a transducer is an accelerometer assembly of the type described in U.S. Pat. No. 3,702,073, invented by Jacobs, issued Nov. 7, 1972, and assigned to the same assignee as the present application. This design is comprised of three primary components, namely, a proof mass assembly which is supported between upper and lower stators. The proof mass assembly includes a movable flapper, or reed, which is cantilevered from an outer annular support member via flexure elements. The flapper and outer annular support member are commonly provided as a unitary, fused quartz piece.

Arcuate capacitor pick-off plates are formed on the upper and lower surfaces of the flapper by means of gold deposition. In addition, upper and lower force-restoring, or torquer coils are mounted to the upper and lower surfaces of the flapper. Each torquer coil is wound on a cylindrical core and is positioned on the flapper such that the longitudinal axis of the cylinder coincides with a line that extends through the center, and is normal to the top and bottom surface of the proof mass assembly.

Each stator is generally cylindrical, having a bore provided through its planar surface. Contained within the bore is a permanent magnet. The bore and permanent magnet are configured such that the torquer coil of the proof mass assembly fits within the bore, with the permanent magnet being positioned within the cylindrical form of the torquer coil. Thus, each stator permanent magnet is in magnetic circuit configuration with a magnetic field as produced by a current flowing through the corresponding torquer coil. Also provided on the planar surface of the stators are capacitive plates configured to form capacitors with the upper and lower capacitor pick-off plates on the proof mass assembly. Thus, movement of the flapper with respect to the upper and lower stators results in a differential capacitance change between the capacitors formed at the upper and lower surfaces of the flapper.

In operation, the accelerometer assembly is affixed to the object to be monitored. Acceleration of the object results in pendulous, rotational displacement of the flapper with respect to outer annular support member and the upper and lower stators. The resulting differential capacitance change caused by this displacement may be sensed by suitable circuity. The circuitry then produces a current which, when applied to the torquer coils, tends to return the flapper to its neutral position. The magnitude of the current required to "restore" the flappers is directly related to the acceleration of the accelerometer.

Accelerometers of the type described in the Jacobs patent are susceptible to bias erros due to stresses created between the stators and the proof mass assembly. These stresses may be transmitted through the outer annular support member to the flexure elements, resulting in a strain thereof and a corresponding deflection of the flapper. This offset is sensed by the associated circuitry, which responds by producing a current through the torquer coils to reposition the flapper. Such correction current represents a bias current error to the accelerometer's output reading.

One source of such offset bias producing stress is found in the means used to clamp, or secure the transducer assembly together. Commonly, the stators and proof mass assembly are held in axial alignment and a bellyband is positioned over the exposed edge of the proof mass and cemented to the upper and lower stators. In one prior art construction, bolts secured the assembly together providing an axial preload, with a bellyband used for lateral support.

The problem with bellyband-type securing means is that they are subject to hoop stress due to the difference in the coefficient of thermal expansion between the stator material, the bellyband material, and the cement used to secure the band to the stators. As a result, a change in temperature of the transducer creates strains between the cement (typically epoxy) and the band and stator elements (typically a metal alloy). Where the assembly utilizes bolts, expansions and contractions of the bolts relative to the transducer assembly similarly create stresses which distort the stators.

In transducer designs, it is desirable, therefore, particularly in high accuracy applications, to provide a means for preloading the transducer elements in a manner that is stable with temperature, time, and other environmental influences.

SUMMARY OF THE INVENTION

The present invention is directed to a method of, and an apparatus for producing a stable, controlled preload on a transducer assembly.

Briefly, according to the invention, a method for producing a controlled preload between the first and second mating sections of a transducer assembly comprises the first step of providing a sleeve member having a side portion with predeterminedly spaced-apart upper and lower flanges projecting therefrom. Each flange is configured to be joined with one of the mating sections of the assembly. A force is applied to the sleeve member to increase the spacing between the flanges. The flanges are then joined to the mating sections. Finally, the applied force to the sleeve member is removed thereby producing a compression force tending to restore the flanges to their prestressed spacing. This compression force is transmitted to the first and second mating sections producing a predetermined preload therebetween.

The step of applying a force to the sleeve member may be performed by providing a band clamp which has a mechanically adjustable radius. The band clamp may be positioned about the sleeve member intermediate said flanges and its radius decreased to produce the desired compression force on the sleeve member side portion. The step of removing the force applied to the sleeve member is thereby conveniently performed by mechanically increasing the radius of the band clamp.

In an alternative approach to applying the force the sleeve member, a provided closed loop band, having a radius at a first temperature predeterminedly less than the radius of the sleeve member side portion and a radius at a second, elevated temperature predeterminedly greater than the radius of the sleeve member side portion, is heated to said second temperature. The band is then positioned about the sleeve member intermediate and flanges and cooled to said first temperature thereby producing the radial compression force on the side portion. The step of removing the force applied to the sleeve member is provided by cutting the closed loop band.

The closed loop band may be formed of a memory alloy, having a radius predeterminedly larger than the radius of the sleeve member side portion. The memory alloy band is then performed to a radius predeterminedly smaller than the radius of the sleeve member side portion and the sleeve member is cooled such that the radius of the side portion decreases to a radius smaller than the radius of the performed band. The band is then positioned about the sleeve member intermediate the flanges and the sleeve member is heated such that thermal expansion thereof increases the radius of the side portion resulting in interference between the sleeve member and the band, thereby producing the radial compression force on the sleeve member side portion. This applied force may be removed by heating the band to the memory temperature of the memory alloy, whereby the band expands to a radius larger than the radius of the sleeve member side portion.

Alternatively, the closed loop band, formed of a memory alloy, has a radius smaller than the radius of the sleeve member side portion. The closed loop band is then performed to a radius predeterminedly larger than the radius of the sleeve member side portion. The closed loop is then positioned about the sleeve member intermediate the flanges. By then heating the closed loop band, thermal contraction thereof results in interference between the sleeve member and the closed loop band, thereby producing the radial compression force on the sleeve member side portion. The compression force may be removed by cutting the closed loop band.

Transducer assembly apparatus comprises a sensor assembly having first and second axially aligned mating sections, with each section having a receiving surface for receiving an applied clamping force to clamp the mating sections together. A clamping means applies a controlled compressive axial preload to the mating sections. The clamping means includes a sleeve member having a side portion with predeterminedly spaced-apart upper and lower flanges projecting therefrom. The flanges bear against the receiving surfaces on the first and second mating sections, with the sleeve member being under elastic deformation such that a compressive force tending to reduce the spacing between the flanges is transmitted to said mating sections as a controlled compressive axial preload.

Preferably, the force exerted by the flanges is applied near the circumference of the mating sections to thereby minimize distortion of the mating sections due to stress.

In a further refinement of the present invention, the transducer includes a proof mass, having a mass element suspended for movement with an outer support member, and first and second stators, the stators being positioned on opposite sides of the proof mass axial alignment therewith and including bearing surfaces for bearing on opposite surfaces of the outer support member. The proof mass outer support member is provided with contact pads, preferably positioned on the circumference of the outer support member, which define the contact areas between the stators and the proof mass. These contact pads are aligned with capacitive plate pick-off areas provided on opposite sides of the mass element. The flanges are configured such that the compressive preload tansmitted from the sleeve member to the proof mass and the stators is axially aligned with the contact areas.

BRIEF DESCRIPTION OF THE DRAWINGS

FIG. 8 is a partial, front view of the sleeve shown in FIG. 3, wherein a closed loop band is used to produce radial compression of the sleeve;

FIG. 9 is a logic flow diagram setting forth the preferred steps for practicing the invention by means of a closed loop band as shown inFIG. 8; and, FIGS. 10 and 11 are logic flow diagrams setting forth alternative preferred steps for practicing the invention wherein the band of FIG. 8 is formed of a memory alloy.

DETAILED DESCRIPTION

Figures 1, 2:
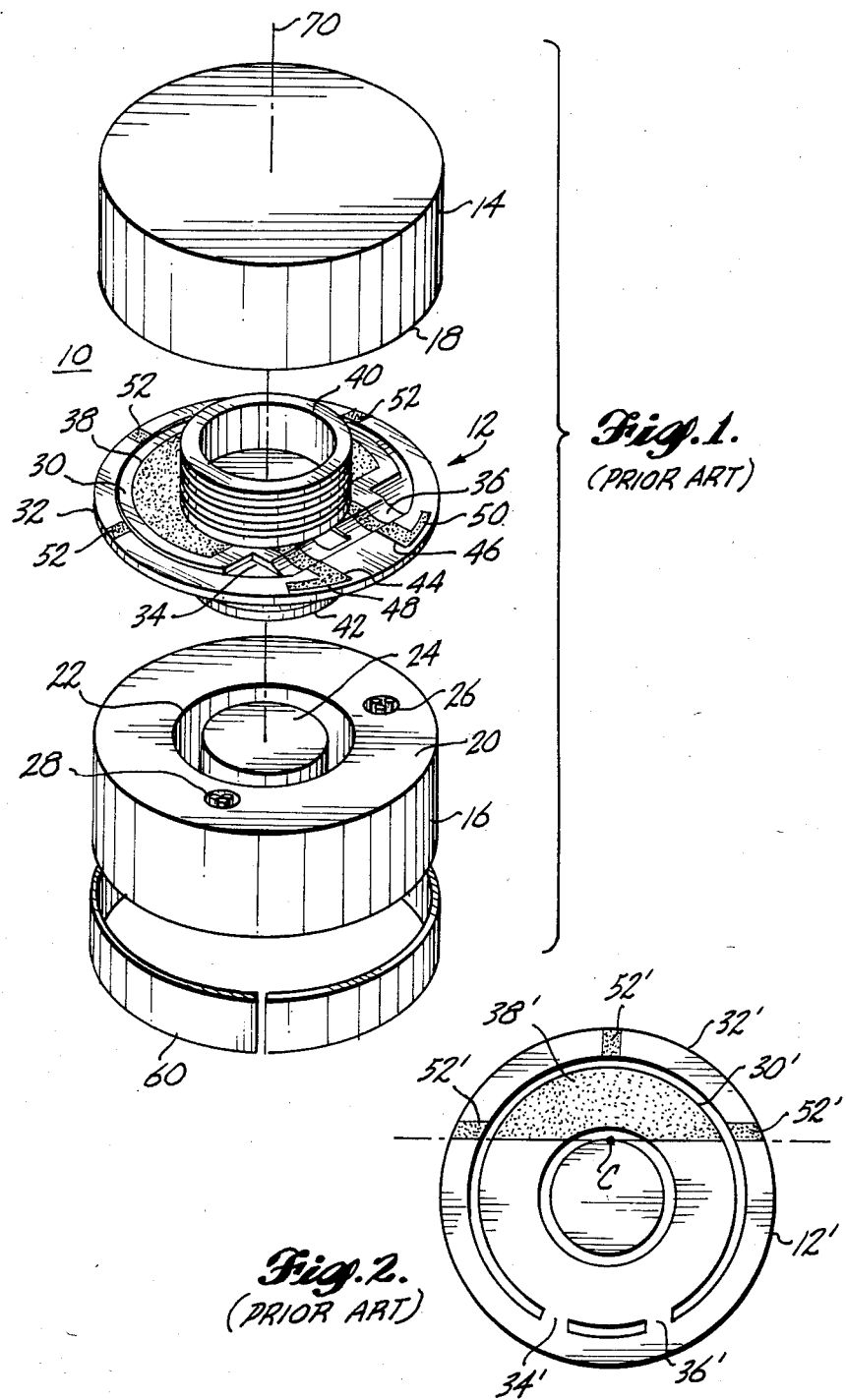
FIG. 1 is an exploded view illustrating a prior art accelerometer construction.
FIG. 2 is a top view of a prior art, improved proof mass assembly for use in the accelerometer shown in FIG. 1.

FIG. 1 is an exploded view of a an accelerometer of the general type described in U.S. Pat. No. 3,702,073 to Jacobs. Here, an accelerometer (or transducer), indicated generally at 10, is comprised of three primary components, namely, a proof mass assembly, indicated generally at 12, and upper and lower stator, or magnet units 14, 16, respectively. The stators 14, 16 are cylindrical, having planar surfaces 18, 20, respectively, which are adapted to abuttingly mate with provided portions of proof mass assembly 12. A bore, such as bore 22, is provided in the central portion of each stator 14 and 16, such that a centrally located permanent magnet may be affixed or formed therein. The bore 22 of lower stator 16 is shown receiving a cylindrical permanent magnet 24, whereas the corresponding bore and permanent magnet of the upper stator are not shown. Electrical contact posts 26, 28 are positioned within bores that are spaced-apart from one another in the planar surface 20 of the lower stator 16. Upon assembly of the accelerometer, the contact post 26, 28 provide electrical connections to contact pads on the proof mass assembly.

The proof mass assembly 12 is comprised of a mass element, commonly called a flapper or reed 30. Flapper 30 is generally circular and is connected to an outer annular support member 32 through a pair of flexure elements 34, 36. The flapper 30, outer annular support member 32 and flexure elements 34, 36 are, preferably, formed as a unitary, fused quartz piece.

An arcuate capacitor pick-off plate 38 is formed, as by gold deposition, on the upper surface of flapper 30. A corresponding capacitor pick-off plate (not shown) extends arcuately along the outer periphery of the lower surface of flapper 30.

A pair of torquer coils 40, 42 mount to the upper and lower surfaces, respectively, of the flapper 30. Each torquer coil is comprised of multiple windings of copper wire on a cylindrical core. The torquer coils 40, 42 are mounted to the flapper 30 such that the longitudinal axis of each torquer core is coincident with a line extending through the center of the proof mass assembly 12, and normal to the upper and lower surfaces of the flapper 30. Electrical connections to the capacitor pick-off plates, such as plate 38, and to the upper and lower torquer coils 40, 42 are provided by thin film pick-off leads 44, 46 which extend over the flexure elements 34, 36 to contacting pads 48, 50 formed on the outer annular support member 32.

A series of contact pads 52 are formed at spaced angular interval around the upper surface of the outer annular support member 32. Corresponding contact pads (not shown) are formed on the lower surface of support member 32. The contact pads are, typically, formed by acid etch.

Upon assembly of the accelerometer 10, the proof mass assembly 12 is support between the upper and lower stators 14, 16, respectively, at contact points defined by the contact pads 52.

Also, assembly of the accelerometer 10 forms a capacitor pair. The first capacitor has spaced-apart, substantially parallel plates comprised of the upper capacitor pick-or plate 38 and the planar surface 18 of the upper stator 14. The second capacitor is formed by the capacitor pick-off plate that is located on the lower surface of the flapper (not shown) and the planar surface 20 of the lower stator 16. Deflection of the flapper 30 with respect to the outer annular support 32 and the planar surfaces 18, 20 of the upper and lower stators 14, 16 produces a differential change in the capacitance of these two capacitors.

Assembly of the accelerometer 10 also results in the torquer coils 40, 42 being coaxially received within annular cavities formed between the permanent magnets, such as magnet 24, and the wall of the bores, such as bore 22.

In final assembly of the accelerometer 10 shown in FIG. 1, an axial force applied at opposite ends of the stators 14, 16 causes the bearing surfaces 18, 20 thereof to bear upon the contact pads 52 of the proof mass assembly 12. A bellyband 60 is then positioned around the outer cylindrical surface of the assembly 10, the bellyband 60 being centered with respect to the edge of the proof mass assembly 12. A suitable cement (not shown), such as epoxy, is affixed to the edges of the band and the corresponding adjacent portions of the stators 14, 16, to thereby secure the stators 14, 16 and proof mass 12 together as a unit.

In operation, the accelerometer 10 is affixed to the object to be monitored with its sensitive axis 70 aligned with the axis to be measured. Acceleration of the object results in a pendulous, rotational displacement of the flapper 30 with respect to the outer annular support member 32 and the stators 14 and 16, with resultant differential change in the capacitance of the two capacitors. The change in capacitance is sensed by suitable sense circuitry (not shown) which, in the known servo manner, produces a current which is passed to the windings of the torquer coils 40, 42. This current results in a magnetic field which, in combination with the stator permanent magnets, such as magnet 24, produces a force tending to "restore" the flapper 30 to its rest position. The current through coils 40, 42 is directly related to the acceleration of the accelerometer and, as such, may be used to produce an appropriate acceleration reading.

As discussed above, the prior art accelerometer design of FIG. 1 is subject to an offset bias error due to differences in material characteristics between the cement, bellyband 60 and stators 14, 16. More specifically, the coefficient of thermal expansion of the cement, which is normally an epoxy, is different than the coefficient of thermal expansion of the metal alloys used to form the band 60 and stators 14, 16. As such, thermal stresses created between the cement, band 60 and the stators 14, 16 are transmitted to the outer annular support member 32 through the pads 52. These transmitted stresses may result in a strain on the flexure elements 34, 36 and a corresponding deflection of the flapper 30. Such deflection by the flapper 30 is sensed by the servo detector circuitry (not shown) which responds by producing a current through the torquer coils 40, 42 thereby tending to reposition the flapper 30. The resultant position change of flapper 30 causes flexures 34, 36 to produce an opposing moment thereby creating a bias offset error current in the accelerometer's output. As described below, the present invention is directed to methods of, and means for substantially reducing, or eliminating such sources of offset bias error by providing a controlled transducer preload which is stable with respect to temperature, time and other environmental influences.

The present invention is particularly suitable for inclusion of an improvement to the accelerometer 10 FIG. 1 which is described in U.S. Pat. No. 4,250,757, invented by Hanson, issued Feb. 17, 1981, and assigned to the same assignee as the present invention. As described in that patent, and with reference to FIG. 2, bias errors of the type described above with reference to the accelerometer of FIG. 1 may be reduced if the contact pads on the outer annular support of the proof mass assembly are aligned on an axis that extends through the centroid of the capacitor pick-off plate.

Thus, with reference to FIG. 2, the proof mass assembly 12' includes a flapper 30' which is suspended from an outer annular support member 32' by means of a pair of flexure elements 34', 36'. An arcuate capacitor pick-off plate 38' is formed, as by gold deposition, on one side of flapper 30'. The corresponding capacitor pick-off plate (not shown) extends arcuately along the outer periphery of the lower surface of flapper 30'.

A series of contact pads 52' are formed at spaced angular intervals around the upper surface of the outer annular support member 32'. Corresponding contact pads (not shown) are formed on the lower surface of support member 32'.

A particular feature of the proof mass assembly 12' shown in FIG. 2 is that the lower edges of opposing contact pads 52' are an axis which extends through the centroid C of the capacitive pick-off plate area 38'. By locating the pads 52' in this manner, motion of the centroid C of the pick-off plate 38' parallel to the sensitive axis (i.e., longitudinal axis) of the accelerometer 10 of FIG. 1 due to stress induded in the outer annular support 32' by clamping the stators 14, 16 together, will be significantly reduced. This reduction is due to the fact that rotation of the flapper 30' about the centroid C of the pick-off area will produce equal pick-off effects on either side of the axis of rotation, thereby tending to cancel pick-off errors due to stress in the flexures 34', 36'.

Figures 3, 4:
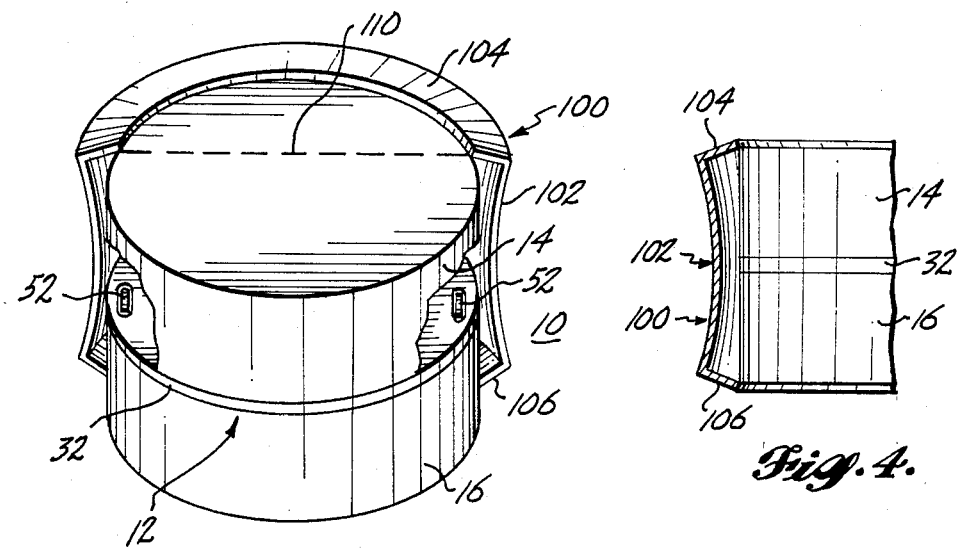
FIG. 3 is a perspective view of a transducer assembly which is clamped by means of a sleeve under elastic deformation.
FIG. 4 is a side view of the transducer assembly and clamping sleeve shown in FIG. 3.

FIG. 3 is a perspective view illustrating the assembled transducer assembly 10 of FIG. 1 secured by the clamping means according to the preferred embodiment of the present invention. More specifically, the stators 14, 16 are pressed into abutting relationship with contact pads (not shown) provided on the outer annular support 32 of the proof mass 12. The stators 14, 16 and proof mass 12 are in axial alignment, presenting a generally cylindrical outer surface.

The transducer assembly 10 has a controlled preload applied thereto by means of a sleeve member 100. Sleeve member 100 is comprised of a side portion 102 having upper and lower flanges 104, 106 projecting therefrom. The side portion 102 is arcuate, having a radius equal to the radius of the outer cylindrical surface of the transducer assembly 10. The flanges 104, 106 have a predetermined spacing, as will be discussed more fully hereinbelow, and project into the concave side of the side portion 102.

Figures 5A, 5B:
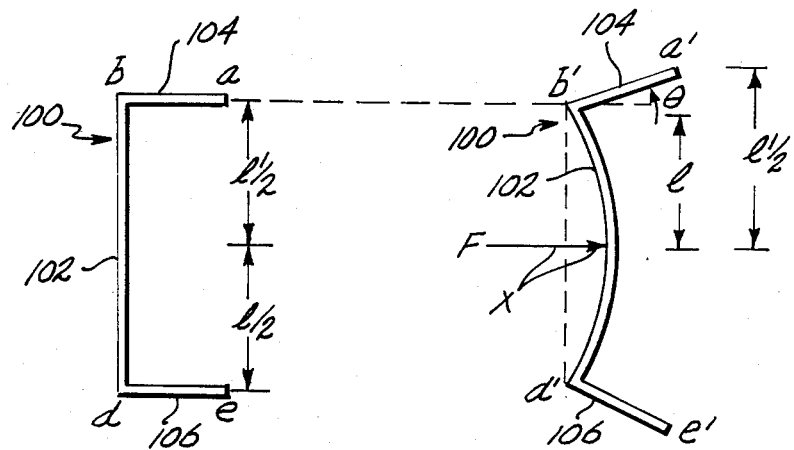
FIGS. 5A and 5B are side views of a portion of a sleeve illustrating the change in flange spacing of the sleeve as a result of an applied force to the sleeve side portion.

As will be understood more fully with respect to FIGS. 5A and 5B, a radial compression force is applied to the side portion 102 of sleeve member 100, tending to increase the spacing between the projecting portions of the upper and lower flanges 104, 106. The sleeve is then positioned over the transducer assembly 10 such that the upper and lower flanges 104, 106 bear against the upper and lower receiving surfaces of the stators 14, 16, respectively. The radial compression force is then removed from side portion 102 creating an axial compression force on the flanges 104, 106 due to elastic recovery of the sleeve member 100. This compression force is transmitted to the stators 14, 16 and to the outer annular support 32, thereby producing a controlled preload therebetween.

In the embodiment of the sleeve member 100 shown in FIG. 3, the arcuate extent of the flanges 104, 106 is defined by a chord 110. The length of chord 110 is selected such that the sleeve member 100 may be positioned over the contact pads 52 of the proof mass assembly 12, the contact pads 52 being positioned on an axis which intersects the centroid of the capacitive pick-off area (see FIG. 2). By this construction, the compression force exerted by the sleeve member 100 on the transducer assembly 10 is carried axially through the contacting pads 52 whereby any variation in the preload force exerted by the sleeve member 100 on the assembly 10, thereby producing a strain on the flexure elements (see FIG. 1), produces a minimal offset bias in the sensing circuitry (not shown) for the reasons discussed above with respect to FIG. 2.

FIG. 4 is a cut-away, side view of the assembly of FIG. 3, illustrating the positioning of the upper and lower stators 14, 16, proof mass outer support ring 32 and the clamping means including sleeve member 100 which is comprised of side portion 102 and upper and lower flanges 104, 106.

FIGS. 5A and 5B, illustrate, respectively, the geometric relationship between the spacing of the flanges 104, 106 of the sleeve member 100 before and after application of a radial compression force. The unstressed sleeve member 100 of FIG. 5A has upper and lower flanges 104, 106 projecting from the side portion 102 at approximately 90° with respect thereto. Upper flange 104 has a length a-b, with lower flange 106 having a length d-e. The spacing between the flanges (i.e., the distance b-d) is a length L, which length is selected to be predeterminedly less than the vertical dimension of the transducer assembly 10, as shown in FIGS. 3 and 4.

In FIG. 5B, a force F is applied to the side portion 102, intermediate the flanges 104, 106, thereby radially compressing side portion 102. In response to the applied force F, the center of the side portion 102 elastically deflects a distance x with the upper and lower flanges 104, 106 rotating outwardly through an angle $\theta$. The force F reduces the chord length b'-d' between the flanges 104, 106, half this length being designated h. The spacing between the outward projecting portions of the flanges 104, 106 now increases to a length l'(i.e., the distance a'-e'). The total increase in spacing between the outward portion of the flanges 104, 106 of FIG. 5B, as compared to the unstressed condition of FIG. 5A, is given by;

$$l' - 1 = 2(a' - b')\sin\theta + 2h - 1.$$

When the force F is removed, sleeve member 100 will, through elastic recovery, attempt to straighten between b'-d' thereby creating a compressive force which, as shown in FIGS. 3 and 4, may be used to produce a preload on the transducer assembly 10.

FIGS. 6-10 depict alternative methods for producing the compression force F on the sleeve member 100.

Figure 6:
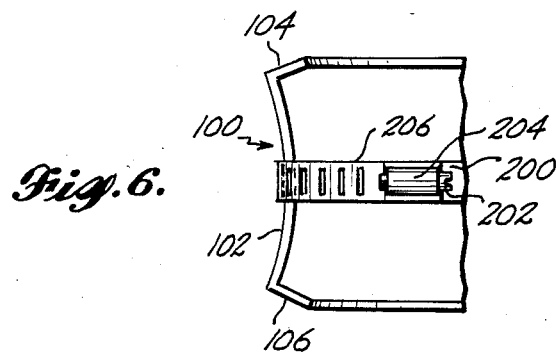
FIG. 6 is a partial, front view of the sleeve shown in FIG. 3 being compressed by means of an adjustable band clamp.

Referring to FIG. 6, shown in partial, face view is the sleeve member 100, having side portion 102 and upper and lower flanges 104, 106, respectively. Positioned about the sleeve member 100, and intermediate the flanges 104, 106 is a mechanically adjustable band clamp 200. Band clamp 200 is of conventional design, having an adjusting screw 202 secured in a housing 204 such that the threads on the screw engage axial slots, such as slot 206, provided in the band clamp 200. Rotation of screw 202 thereby varies the radius of the band clamp 200.

Figure 7:
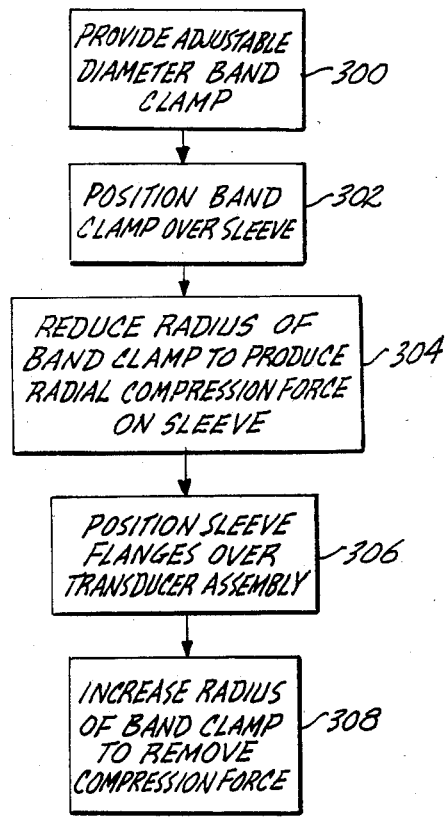
FIG. 7 is a logic flow diagram setting forth the preferred steps for practicing the invention by means of the adjustable band clamp shown in FIG. 6.

FIG. 7 is a flow diagram detailing the steps used for compressing sleeve member 100 of FIG. 6 by means of the mechanically adjustable band clamp 200. The band clamp is provided at 300, and positioned over the sleeve member 100, intermediate the flanges 104, 106 at 302. For applications wherein sleeve member 100 is less than a full ring (such as shown in FIG. 6) a matching tool (not shown) to complete the ring is used for support of the band clamp 200 during the clamping process. At 304, the radius of band clamp 200 is reduced, by means of screw 202, until the desired radial compression force is applied to the sleeve member 100. The flanges 104, 106 of the sleeve member 100 are then positioned over the transducer assembly at 306 in position to bear upon the upper and lower receiving surfaces of the stators (14, 16, respectively of FIG. 3). The radius of the band clamp 200 is increased at 308, thereby removing the radial compression force on sleeve member 100 and, by elastic recovery, causing sleeve 100 to produce the axial preload on the transducer assembly.

FIG. 8 illustrates an alternative method for applying the radial compression force to the sleeve member 100. Here, as before, sleeve member 100 is comprised of side portion 102 and upper and lower flanges 104, 106, respectively.

One alternative method of applying the radial compression to the sleeve member 100 is set forth in the flow diagram of FIG. 9. Here, a closed loop band 400 is provided at 402. Closed loop band 400 is designed such that at a first temperature it has a radius which is less than the radius of the sleeve member 100, whereas at a second, elevated temperature the radius of closed loop band 400 is greater than the radius of sleeve member 100. Closed loop band 400 is heated at 404 until its radius exceeds the radius of sleeve member 100. The closed loop band is then slipped over the sleeve member 100, intermediate the flanges 104, 106, at 406. At 408, the closed loop band 400 is cooled, whereby it contracts to its original radius, producing the desired compression force on sleeve member 100. The sleeve flanges 104, 106 are then positioned over the transducer assembly at 410. At 412, the closed loop band 400 is cut, thereby permitting elastic recovery of sleeve member 100 and producing the resultant axial compression force on the transducer.

FIG. 10 is a flow diagram detailing the flow steps of an alternative method of radially compressing the sleeve member 100. Here, at 502, the band 400 of FIG. 8 is formed of a memory alloy, having a radius greater than the radius of the sleeve member 100. It is a characteristic of memory alloys that if they are plastically deformed at one temperature, they will completely recover to their original shape upon being raised to a "memory" temperature. Numerous memory, or marmen, alloys are known to the art including alloys of iron-platinum, indium-cadmium, iron-nickel, nickel-aluminum, stainless steel, nickel-titanium and copper-zinc-aluminum. The choice of a particular memory alloy for forming band 400 is dependent upon the specific application and includes factors such as the suitability of a particular alloy to the working environment, cost and so forth.

At 504, the memory alloy band is preformed to a radius less than the radius of sleeve member 100. The sleeve member 100 is then cooled, at 506, such that it contracts to a radius less than the radius of the preformed memory alloy band 400. At 508, the memory alloy band 400 is slipped about the cooled sleeve member 100, intermediate the flanges 104, 106. The sleeve member 100 is then heated, at 510, such that its expansion produces interference with the memory alloy band 400 resulting in the desired radial compression force on sleeve member 100. The sleeve member 100 is then positioned over the transducer assembly such that the flanges are in a position to be joined with receiving surfaces thereon, at 512. Now, at 514, the memory alloy band 400 is heated to its memory temperature, increasing the radius thereof, and permitting elastic recovery of the sleeve member 100 to thereby produce a resultant axial compression force on the transducer.

Figure 11:
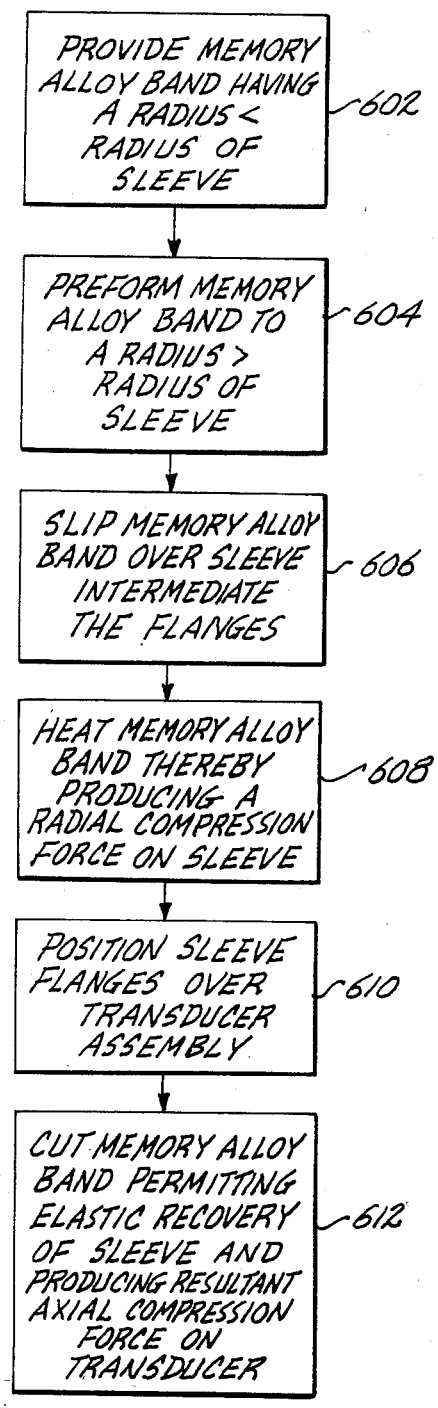

FIG. 11 is an alternative method for applying the radial compression to the sleeve member 100, wherein the band 400 of FIG. 8 is formed of a memory alloy. At 602, a memory alloy band 400 is provided having a radius less than the radius of the sleeve 100. The memory alloy band 400 is then preformed, at 604, to a radius greater than the radius of the sleeve 100. The memory alloy band 400 is then slipped over the sleeve 100, at 606, intermediate the flanges 104, 106. At 608, the memory alloy band 400 is heated, thereby producing a radial compression force on the sleeve 100. The sleeve flanges 104, 106 are then positioned over the transducer assembly, at 610, such that the flanges 104, 106 are in a position to be joined with transducer assembly receiving surfaces. Finally, at 612, the memory alloy band 400 is cut, permitting elastic recovery of the sleeve 100 and producing a resultant axial compression force on the transducer.

For any of the methods described in FIGS. 9, 10, or 11 if the sleeve member 100 is less than a full ring (such as shown in FIG. 8) a matching tool (not shown) to complete the ring is used for support of the band 400 during the clamping process.

The method of, and apparatus for clamping a transducer assembly as described herein provides significant advantages over approaches known to the prior art. For example, the sleeve member as described herein may be formed of the same material as the transducer elements it clamps, as for example the stators shown in FIGS. 3 and 4. As such, the coefficient of thermal expansion of the clamping means tracks that of the transducer elements, thereby minimizing thermally related stresses. In addition, by proper design of the sleeve element, any desired preload may be applied to the transducer assembly, this preload being the same from unit to unit.

While preferred embodiments of the invention have been described in detail, it should be apparent that many modifications and variations thereto are possible, all of which fall within the true spirit and scope if the invention.

For example, in certain applications it may be desirable to form the sleeves and/or the compression band asymmetrically, or to apply the radial compression force to the sleeve member asymmetrically with respect to the projecting flanges. The present design may be easily modified to accommodate such variations.

Further, the present design may be used to apply a compression force to other than circular structures. In addition, the upper and lower flanges may be comprised of a series of fingers. The fingers could be used to limit the compression force applied to a structure without using inordinately thin continuous flanges.

In certain applications, it might be desirable to vary the thickness of the sleeve in a symmetrical way, such as thinner at the midplane between the top and bottom flanges, to thereby alter the compression characteristics. The present invention is easily modified to perform this function.

In addition, whereas the above-described clamping means is comprised of upper and lower flanges projecting from a side portion, either, or both, of the flanges could be of limited extent being secured to the side face of the appropriate stator with a weld or other securing means. In the extreme case, the flange could comprise the end of a side portion connected through a weld or other securing means to the appropriate stator.

The embodiments of the invention in which an exclusive property or privilege is claimed are defined as follows:

1. A method for producing a controlled preload between the first and second mating sections of a transducer assembly, the method comprising the steps of:
   (a) providing a sleeve member, said sleeve member having a side portion with predeterminedly spaced apart upper and lower flanges projecting therefrom, each flange configured to be joined with one of said mating sections;
   (b) applying a force to said sleeve member to thereby increase the spacing between said flanges;
   (c) joining each flange to one of said mating sections; and (d) removing said force applied to said sleeve member thereby producing a compression force tending to restore said flanges to their prestressed spacing, whereby said compression force is transmitted to said first and second mating sections producing a predetermined preload therebetween.

2. The method of claim 1, wherein said first and second mating sections are generally cylindrical in shape, the sensor assembly being formed by aligning the longitudinal axes of said mating sections, thereby forming a cylindrical outer surface, and applying an axial compression force therebetween, wherein step (a) comprises the step of:

providing said sleeve member configured such that said side portion is arcuate, having a radius substantially equal to the radius of said cylindrical outer surface, and wherein said flanges project from said side portion into the concave side thereof, the spacing between said flanges being a predetermined function of the axial length of said sensor assembly, the sleeve member exhibiting a predetermined elasticity, whereby in response to said applied force of step (b) then flange spacing allows the sleeve member to be slipped over a portion of the cylindrical outer surface of said sensor assembly and removal of said force in step (d) causes said flanges to engage the upper and lower surfaces of said sensor assembly applying an axial compression preload thereto through elastic recovery of said sleeve member.

3. The method of claim 2, wherein step (b) comprises the step of:

applying a radial compression force to said side portion, intermediate said spaced apart flanges, compressing the same and rotating said flanges outwardly to increase the spacing between the projecting portions thereof.

4. The method of claim 3, wherein step (b) comprises the steps of:
(i) providing a band clamp, said band clamp having a mechanically adjustable radius,
(ii) positioning said band clamp about said sleeve member intermediate said flanges, and
(iii) mechanically decreasing the radius of said band clamp to produce said radial compression force on said side portion.

5. The method of claim 4, wherein step (d) comprises the step of:
mechanically increasing the radius of said band clamp.

6. The method of claim 3, wherein step (b) comprises the steps of:
(i) providing a closed loop band having a radius at a first temperature predeterminedly less than the radius of said sleeve member side portion and a radius at a second, elevated temperature predeterminedly greater than the radius of said sleeve member side portion,
(ii) heating said closed loop band to said second temperature,
(iii) positioning said closed loop band about said sleeve member intermediate said flanges, and
(iv) cooling said closed loop band to said first temperature thereby producing said radial compression force on said side portion.

7. The method of claim 6, wherein step (d) comprises the step of cutting said closed loop band.

8. The method of claim 3, wherein step (b) comprises the steps of:
(i) providing a closed loop band formed of a memory alloy, said closed loop band having a radius predeterminedly larger than the radius of said sleeve member side portion,
(ii) preforming said closed loop band to a radius predeterminedly smaller than the radius of said sleeve member side portion,
(iii) cooling said sleeve member such that the radius of said side portion decreases to a radius smaller than the radius of said preformed closed loop band,
(iv) positioning said closed loop band about said sleeve member intermediate said flanges, and
(v) heating said sleeve member such that the thermal expansion thereof increases the radius of said side portion resulting in interference between said sleeve member and said closed loop band, thereby producing said radial compression force on said sleeve member side portion.

9. The method of claim 8, wherein step (d) comprises the step of:
heating said closed loop band to the memory temperature of said memory alloy whereby said closed loop band expands to a radius larger than the radius of said sleeve member side portion.

10. The method of claim 3, wherein step (b) comprises the steps of:
(i) providing a closed loop band formed of a memory alloy, said closed loop band having a radius predeterminedly smaller than the radius of said sleeve member side portion,
(ii) preforming said closed loop band to a radius predeterminedly larger than the radius of said sleeve member side portion,
(iii) positioning said closed loop band about said sleeve member intermediate said flanges, and
(iv) heating said closed loop band such that the thermal contraction thereof results in interference between said sleeve member and said closed loop band, thereby producing said radial compression force on said sleeve member side portion.

11. The method of claim 10, wherein step (d) comprises the step of:
cutting said closed loop band.

12. A method for assembling a transducer comprising the steps of:
(a) providing a transducer assembly, the transducer assembly including first and second stators and a proof mass, the proof mass including a mass element suspended for movement within an outer support member, the stators being positioned on opposite sides of the proof mass and including bearing surfaces for bearing on opposite surfaces of said outer support member, said stators further having provided receiving surfaces for receiving an applied preload force;
(b) providing a sleeve member, said sleeve member having a side portion with predeterminedly spaced apart upper and lower flanges projecting therefrom, each flange configured to be joined with one of said receiving surfaces on one of said first and second stators;
(c) predeterminedly stressing said sleeve member to thereby increase the spacing of said flanges;
(d) joining each flange to said receiving surface on one of said first and second stators; and (e) removing said predetermined stress from said sleeve member thereby producing a compression force tending to restore said flanges to their prestressed spacing, whereby said compression force is transmitted to said transducer assembly producing a predetermined preload between said first and second stators and said outer support member.

13. The method of claim 12, wherein:

step (a) includes the step of providing each of said first and second stators and said proof mass configured generally cylindrically, the assembly of the stators and the proof mass including aligning the longitudinal axes thereof, thereby forming a cylindrical outer surface; and step (b) includes the step of providing said sleeve member configured such that said side portion is arcuate, having a radius substantially equal to the radius of said transducer assembly cylindrical outer surface, and wherein said flanges project from said side portion into the concave side thereof, the spacing between said flanges being a predetermined function of the axial length of said transducer assembly, the sleeve member exhibiting a predetermined elasticity, whereby in response to said predetermined stressing of step (c) the spacing of said flanges allows the sleeve member to be slipped over a portion of the cylindrical outer surface of said transducer assembly and removal of said predetermined stress in step (e) causes said flanges to engage the receiving surface of first and second stators and apply an axial compression preload thereto through elastic recovery of said sleeve member.

14. The method of claim 13, wherein step (c) comprises the step of:

applying a radial compression force to said side portion, intermediate said spaced apart flanges, compressing said side portion and rotating said flanges outwardly to increase the spacing between the projecting portions thereof.

15. The method of claim 14, wherein step (c) comprises the step of:

(i) providing a band clamp having a mechanically adjustable radius, (ii) positioning said band clamp about said sleeve member intermediate said flanges, and (iii) mechanically decreasing the radius of said band clamp to produce said radial compression force on said side portion.

16. The method of claim 15, wherein step (e) comprises the step of:

mechanically increasing the radius of said band clamp.

17. The method of claim 14, wherein step (c) comprises the steps of:

(i) providing a closed loop band having a radius at a first temperature predeterminedly less than the radius of said sleeve member side portion and a radius at a second, elevated temperature predeterminedly greater than the radius of said sleeve member side portion, (ii) heating said band to said second temperature, (iii) positioning said band about said sleeve member intermediate said flanges, and (iv) cooling said band to said first temperature thereby producing said radial compression force on said side portion.

18. The method of claim 17, wherein step (e) comprises the step of cutting said closed loop band.

19. The method of claim 14, wherein step (c) comprises the steps of:

(i) providing a closed loop band formed of a memory alloy, said closed loop band having a radius predeterminedly larger than the radius of said sleeve member side portion, (ii) preforming said closed loop band to a radius predeterminedly smaller than the radius of said sleeve member side portion, (iii) cooling said sleeve member such that the radius of said side portion decreases to a radius smaller than the radius of said preformed closed loop band, (iv) positioning said closed loop band about said sleeve member intermediate said flanges, and (v) heating said sleeve member such that the thermal expansion thereof increases the radius of said side portion resulting in interference between said sleeve member and said closed loop band, thereby producing said radial compression force on said sleeve member side portion.

20. The method of claim 19, wherein step (e) comprises the step of:

heating said band to the memory temperature of said memory alloy, whereby said band expands to a radius larger than the radius of said sleeve member side portion.

21. The method of claim 14, wherein step (c) comprises the steps of:

(i) providing a closed loop band formed of a memory alloy, said closed loop band having a radius predeterminedly smaller than the radius of said sleeve member side portion, (ii) preforming said closed loop band to a radius predeterminedly larger than the radius of said sleeve member side portion, (iii) positioning said closed loop band about said sleeve member intermediate said flanges, and (iv) heating said closed loop band such that the thermal contraction thereof results in interference between said sleeve member and said closed loop band, thereby producing said radial compression force on said sleeve member side portion.

22. The method of claim 21, wherein step (e) comprises the step
cutting said closed loop band.

23. The method of claim 12, wherein:

step (a) comprises the step of providing said proof mass outer support member with predeterminedly positioned contact portions, said contact portions defining the areas of contact between said proof mass and said first and second stators; and step (b) comprises the step of providing said sleeve member with said flanges configured to be joined with said receiving surfaces on said first and second stators such that said flanges are axially aligned with said contact portions.

24. The method of claim 23, wherein step (a) comprises the step of providing capacitive plate pick-off areas on opposite sides of said mas element and providing said predeterminedly positioned contact portions on an axis that intersects the centroid of said capacitive plate pick-off areas.

25. The method of claim 13, wherein:

step (a) comprises the further steps of:

(i) providing capacitive plate pick-off areas on opposite sides of said mass element, and (ii) providing said proof mass outer support member with contact portions for defining the areas of contact between said proof mass assembly and said first and second stators, said contact portions being predeterminedly positioned on an axis that intersects the centroid of said capacitive plate pick-off areas.

26. The method of claim 25, wherein step (b) comprises the step or providing said sleeve member flanges configured to be joined with said receiving surfaces on said first and second stators such that the compression force exerted by said sleeve member on said transducer assembly is axially aligned with said contact portions.

27. A transducer assembly comprising:
a sensor assembly having first and second axially aligned mating sections, each section having a receiving surface for receiving an applied clamping force to clamp said mating sections together; and
clamping means for applying a controlled compressive axial preload to said mating sections, said clamping means comprising a sleeve member having a side portion with predeterminedly spaced apart upper and lower flanges projecting therefrom, said flanges bearing against said receiving surfaces on said first and second mating sections, said sleeve member being under elastic deformation such that a compressive force tending to reduce the spacing between the flanges is transmitted to said mating sections as a controlled compressive axial preload.

28. The transducer of claim 27, wherein:
the outer surface of said axially aligned mating sections is generally cylindrical in shape, and
said clamping means sleeve member is configured such that said side portion is arcuate having a radius substantially equal to the radius of said axially aligned mating sections outer surface, and said flanges project from said side member into the concave side thereof.

29. A transducer assembly comprising:
a proof mass including a mass element suspended for movement within an outer support member;
first and second stators, the stators being positioned on opposite sides of said proof mass in axial alignment therewith and including bearing surfaces for bearing on opposite surfaces of said outer support member, said stators having predetermined receiving surfaces for receiving an applied clamping force; and
clamping means for applying a controlled compressive axial preload to said stators and said proof mass, said clamping means comprising a sleeve member having a side portion with predeterminedly spaced apart upper and lower flanges projecting therefrom, said flanges bearing against said predetermined receiving surfaces on said first and second stators, said sleeve member being under elastic deformation such that a compressive force tending to reduce the spacing between the flanges is transmitted to said stators and said proof mass as a controlled compressive axial preload.

30. The transducer assembly of claim 29, wherein
the outer surfaces of said proof mass and said stators are generally cylindrical in shape, the assembly of said proof mass and stators presenting a generally cylindrical outer surface, and
wherein said clamping means sleeve member is configured such that said side portion is arcuate having a radius substantially equal to the radius of said transducer assembly cylindrical outer surface, and said flanges project from said side member into the concave side thereof.

31. The transducer assembly of claim 30, wherein said proof mass outer support member is provided with predeterminedly positioned contact pads for defining the contact areas between the stators and the proof mass, and
said flanges and said receiving surfaces on said first and second stators are configured such that the compressive preload transmitted from the sleeve member to said proof mass and stators is axially aligned with said contact areas.

32. The transducer assembly of claim 29, wherein capacitive plate pick-off areas are provided on opposite sides of said mass element, and
wherein said outer support contact pads are aligned with respect to the centroid of said capacitive plate pick-off areas.

* * * * *